(12) United States Patent
Chen

(10) Patent No.: US 11,872,460 B2
(45) Date of Patent: Jan. 16, 2024

(54) ELECTROMAGNETIC RESISTANCE FEEDBACK SYSTEM FOR BICYCLE TRAINING DEVICE

(71) Applicant: BION INC., Taipei (TW)

(72) Inventor: Shui Jung Chen, Taipei (TW)

(73) Assignee: BION Inc., New Taipei (TW)

( * ) Notice: Subject to any disclaimer, the term of this patent is extended or adjusted under 35 U.S.C. 154(b) by 531 days.

(21) Appl. No.: 17/034,424

(22) Filed: Sep. 28, 2020

(65) Prior Publication Data

US 2021/0106863 A1   Apr. 15, 2021

(30) Foreign Application Priority Data

Oct. 9, 2019   (TW) .................................. 108136671

(51) Int. Cl.
*A63B 21/005*   (2006.01)
*A63B 22/06*   (2006.01)
(Continued)

(52) U.S. Cl.
CPC .......... *A63B 69/16* (2013.01); *A63B 21/0052* (2013.01); *A63B 22/0605* (2013.01);
(Continued)

(58) Field of Classification Search
None
See application file for complete search history.

(56) References Cited

U.S. PATENT DOCUMENTS

| | | | |
|---|---|---|---|
| 2003/0073546 A1 * | 4/2003 | Lassanske | A63B 69/16 482/61 |
| 2011/0195818 A1 * | 8/2011 | Schroeder | A63B 21/0052 482/5 |

(Continued)

FOREIGN PATENT DOCUMENTS

| | | | | |
|---|---|---|---|---|
| EP | 3165261 A1 * | 5/2017 | | A63B 21/00069 |
| TW | M514026 | * | 12/2015 | |
| TW | M514026 U | * | 12/2015 | |

*Primary Examiner* — Shila Jalalzadeh Abyaneh
(74) *Attorney, Agent, or Firm* — Rosenberg, Klein & Lee

(57) ABSTRACT

An electromagnetic resistance feedback bicycle training device includes a bicycle trainer frame, an electricity generator, and a resistance feedback system. The electricity generator and the resistance feedback system are mounted on the bicycle trainer frame. The resistance feedback system includes a transmission system connectable to an external electronic device, an electromagnetic resistance generation unit operable to induce an electromagnetic resistance force to a rotating object, a feedback circuit, and a control unit. The control unit detects, by means of an electromagnetic detection element of the feedback circuit, a strength of an electromagnetic field generated by the electromagnetic resistance generation unit, and, in response to the strength of the electromagnetic field, adjusts a level of the electromagnetic resistance force generated by the electromagnetic resistance generation unit. As such, the present invention enables self-generation of electricity and self-supply of electrical power without connection with an external power source and features instantaneous feed-back of electromagnetic resistance force and self-adjustment for maintaining a constant level of the electromagnetic resistance force.

10 Claims, 8 Drawing Sheets

(51) Int. Cl.
  *A63B 24/00* (2006.01)
  *A63B 69/16* (2006.01)
  *H02K 7/18* (2006.01)

(52) U.S. Cl.
  CPC ....... *A63B 24/0087* (2013.01); *H02K 7/1846* (2013.01); *A63B 2024/0093* (2013.01); *A63B 2220/833* (2013.01); *A63B 2220/89* (2013.01)

(56) References Cited

U.S. PATENT DOCUMENTS

| | | | |
|---|---|---|---|
| 2012/0217758 A1* | 8/2012 | Chen | A63B 21/225 74/640 |
| 2014/0171266 A1* | 6/2014 | Hawkins, III | A63B 24/0087 482/5 |
| 2017/0128764 A1* | 5/2017 | Hsu | A63B 21/0054 |
| 2018/0102695 A1* | 4/2018 | Lee | H02K 7/104 |

* cited by examiner

ELECTROMAGNETIC RESISTANCE FEEDBACK SYSTEM FOR BICYCLE TRAINING DEVICE

BACKGROUND OF THE INVENTION

1. Field of the Invention

The present invention relates to a bicycle training device, and in particular to a pedaling training device that features electrical power generation and automatic adjustment of resistance force.

2. The Related Arts

Conventional electricity-generating hubs, such as Taiwan Patent Publication No. 1260854, which discloses a disk-fashion electricity-generating hub; Taiwan Patent Publication No. 1248615, which discloses a power generating hub; and Taiwan Utility Model Publication No. M273890, which discloses a stator unit of an electricity-generating hub, all uses an electricity-generating coil as a stator and a permanent magnet as a rotor, so that when the rotor rotates with a wheel axle, the permanent magnet and the electricity-generating coil induce and generate electricity.

However, due to limited spaces and related technology threshold, such known electricity generators, particularly the electricity-generating hubs, can only be arranged with one single electricity generating coil. As such, the known structure of combining an electricity generator with a hub generates only a very limited amount of electrical power.

On the other hand, a common bicycle training device is often equipped with a resistance device, which increases a resistance force against pedaling, in order to improve the effectiveness of training. An example is U.S. Pat. No. 10,315,073B2, which provides a bicycle trainer and a method of its operation. The most commonly used resistance devices can be classified as wind resistance, magnetism resistance, and fluid resistance, among which the magnetism resistance means makes use of a magnetic force to control the resistance of pedaling and the most commonly used nowadays is an electromagnetic device, which uses a magnitude of an electrical current flowing through a coil to control a magnitude of an electromagnetic force generated thereby.

However, such as magnetism-resistance based trainer device has a shortcoming that the magnetic force generated thereby is significantly affected by a temperature effect. Specifically, when the time of operation of the trainer extends, or in case that the pedaling resistance is set at an excessively high level, the operation temperature would increase, and the increase of temperature leads to reduction of the magnetic force so generated, resulting in reduction of the resistance force.

Thus, it is desired to have an electromagnetic resistance feedback system that significantly increases electricity generated thereby, enables self-supply of electrical power, and features self-feedback of resistance level and self-adjustment of the resistance level.

SUMMARY OF THE INVENTION

An objective of the present invention is to provide an electromagnetic resistance feedback system for a bicycle training device, which features autonomous electricity generation for self-supply without connection with an external power source and also features instantaneous feedback of resistance force and self-adjustment of the resistance force to maintain at a predetermined level.

To achieve the above objective, the present invention provides an electromagnetic resistance feedback system for a bicycle training device, comprising a bicycle trainer frame for connection with a bicycle; an electricity generator, which is mounted to the bicycle trainer frame; and a resistance feedback system, which is mounted to the bicycle trainer frame. The resistance feedback system comprises a transmission system, which is operable for interaction with an external electronic device; an electromagnetic resistance generation unit, which is excitable by an electrical current to generate an electromagnetic field that induces an electromagnetic resistance force to a rotating object; a feedback circuit, which comprises an electromagnetic detection element, the electromagnetic detection element being mounted to the electromagnetic resistance generation unit; and a control unit, which is electrically connected to the transmission system, the electromagnetic resistance generation unit, the feedback circuit, and the electricity generator. The control unit is operable to detect, by means of the electromagnetic detection element, the electromagnetic field generated by the electromagnetic resistance generation unit and to adjust a level of the electromagnetic resistance force generated by the electromagnetic resistance generation unit according to a strength of the electromagnetic field. The control unit controls the electromagnetic resistance generation unit to generate a predetermined electromagnetic field strength level; and when the electromagnetic detection element detects the electromagnetic field generated by the electromagnetic resistance generation unit being different from the predetermined electromagnetic field strength level, the control unit controls the electromagnetic resistance generation unit to adjust the electromagnetic field generated thereby such that the strength of the electromagnetic field matches with the predetermined electromagnetic field strength level.

As such, the electromagnetic resistance feedback system according to the present invention uses the electricity generator for self-supply of electrical power required by the system thereof and makes use of the feedback circuit to instantaneously detect the actual electromagnetic field strength generated by the electromagnetic resistance generation unit and also to adjust the level of resistance generated by the electromagnetic resistance generation unit according to the actual electromagnetic field strength so detected. In other words, the present invention enables self-generation of electrical power and self-feedback and self-adjustment of the level of the resistance force.

Preferably, the transmission system is able to receive a resistance control parameter from the external electronic device, and the control unit is able to adjust the level of the electromagnetic resistance force generated by the electromagnetic resistance generation unit according to the resistance control parameter. The resistance control parameter may comprise at least one of speed, slope, and wind resistance. In other words, the external electronic device may input, according to a specific training program, a resistance control parameter to the resistance feedback system, in order to generate a specific level for the resistance force.

Preferably, the electromagnetic resistance generation unit comprises a drive circuit and a resistance brake device (also referred to herein as a resistance applying device), the drive circuit being electrically connected to the control unit and the resistance applying device, the control unit being operable to control the drive circuit to adjust the strength of the electromagnetic field generated by the resistance applying device. The control unit applies a pulse width modulation (PWM) to control the resistance driver circuit. When the strength of the electromagnetic field generated by the electromagnetic resistance generation unit is less than the predetermined electromagnetic field strength level, the control unit increases a duty cycle of the pulse width modulation signal; and when the strength of the electromagnetic field generated by the electromagnetic resistance generation unit is greater than the predetermined electromagnetic field strength level, the control unit decreases the duty cycle of the pulse width modulation signal.

Preferably, the electricity generator comprises an outer annular frame and an inner annular frame formed on the rotating object, wherein the inner annular frame is disposed in an interior of the outer annular frame to form a concentric arrangement. A first electricity generation unit is disposed between the outer annular frame and the inner annular frame of the rotating object. A second electricity generation unit is disposed in an interior of the inner annular frame of the rotating object. When the rotating object is driven to rotate, at least one of the first electricity generation unit and the second electricity generation unit is caused to generate electricity. The present invention provides multiple electricity generation units disposed, in a concentric arrangement, inside a rotating object, and each of the electricity generation units is operable to generate electricity independently, in order to not only increase the capacity of power generation, but also make the size compact. In other words, the present invention may effectively increase the capacity of power generation but does not affect the size of an existing rotating object, and the structure is simple and the costs of fabrication and materials are low.

Preferably, the first electricity generation unit comprises a plurality of first magnetic elements and a first electricity-generating coil, and the second electricity generation unit comprises a plurality of second magnetic elements and a second electricity-generating coil; the plurality of first magnetic elements are arranged on the outer annular frame in an equally-spaced manner and the plurality of second magnetic elements are arranged on the inner annular frame in an equally-spaced manner; the first electricity-generating coil is arranged between the outer annular frame and the inner annular frame and is spaced from the plurality of first magnetic elements by a gap, and the second electricity-generating coil is arranged in the interior of the inner annular frame and is spaced from the plurality of second magnetic elements by a gap.

Preferably, the resistance feedback system comprises a roller coupled to the rotating object; the bicycle has a rear wheel having a wheel axle mounted to the bicycle trainer frame, the rear wheel of the bicycle being in contact with the roller.

Preferably, a mounting frame may be further mounted to the bicycle trainer frame, and the first electricity-generating coil and the second electricity-generating coil are mounted on the mounting frame.

Preferably, the electromagnetic resistance generation unit comprises a C-shaped silicon lamination and at least one winding wound around the C-shaped silicon lamination, the C-shaped silicon lamination having a pair of opposite open ends being arranged to adjacently face two opposite surfaces of the rotating object respectively.

The specific technique of the present invention will be further described in respect of embodiments provided below, with reference being had to the attached drawings.

DETAILED DESCRIPTION OF THE PREFERRED EMBODIMENTS

The present invention will be explained below with reference to a detailed description of an embodiment thereof. It is noted that in the following description, similar elements are designated with the same references. Further, the drawings are provided for illustration purpose only and may not be drawn to scale, and further, such drawings may not completely show all details.

Figure 1:
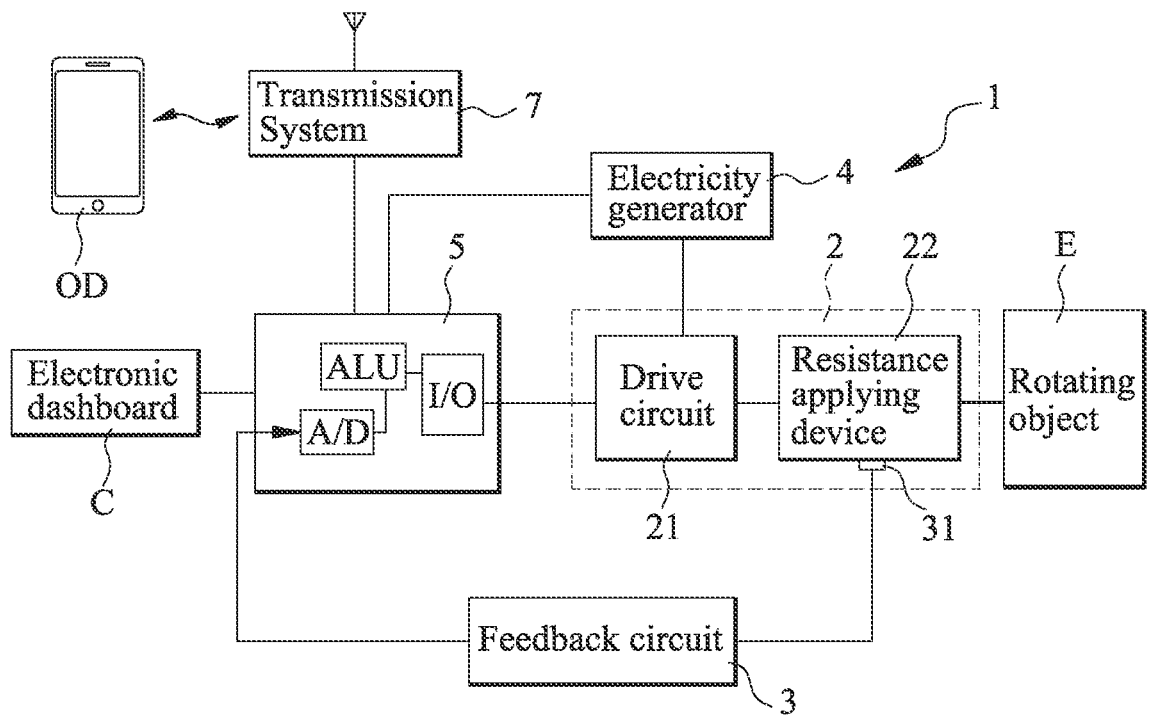
FIG. 1 is a system block diagram of a preferred embodiment according to the present invention.

Referring first to FIG. 1, a system block diagram of a preferred embodiment according to the present invention is shown. As shown in the drawing, a resistance feedback system of the instant embodiment mainly comprises an electromagnetic resistance generation unit 2, a feedback circuit 3, a transmission system 7, a control unit 5, and an electronic instrument C. In the system, a rotating object E is made of a magnetic material, and the electromagnetic resistance generation unit 2 is generally excited by an electrical current to generate an electromagnetic field to induce an electromagnetic resistance force to the rotating object E, meaning the electromagnetic resistance generation unit 2 generates an electromagnetic resistance force through electromagnetic induction in order to apply a resistance force to the rotating object E.

Further, the electromagnetic resistance generation unit 2 of the instant embodiment comprises a drive circuit 21 and a resistance applying device 22, wherein the drive circuit 21 is electrically connected to an electricity generator 4, the control unit 5, and the resistance applying device 22. The drive circuit 21 drives and controls the resistance applying device 22. The control unit 5 controls the drive circuit 21 to control activation or deactivation of the resistance applying device 22 and to adjust a magnitude of the electromagnetic field generated thereby.

The feedback circuit 3 of the instant embodiment comprises an electromagnetic detection element 31, which is mounted to the electromagnetic resistance generation unit 2. The electromagnetic detection element 31 can be for example a Hall sensor, which detects variation of the electromagnetic field for conversion into an output voltage, and thus, for different levels of the magnitude of the electromagnetic field, the electromagnetic detection element 31 outputs different voltages. For example, the larger the magnitude of the electromagnetic field is detected, the smaller the voltage output from the detector will be, and vice versa. However, embodiment of the present invention is not limited to the output voltage (voltage feedback) so detected and may be operated to output a detected current (current feedback) or other analog or digital electronic feedback signal.

Figure 2:
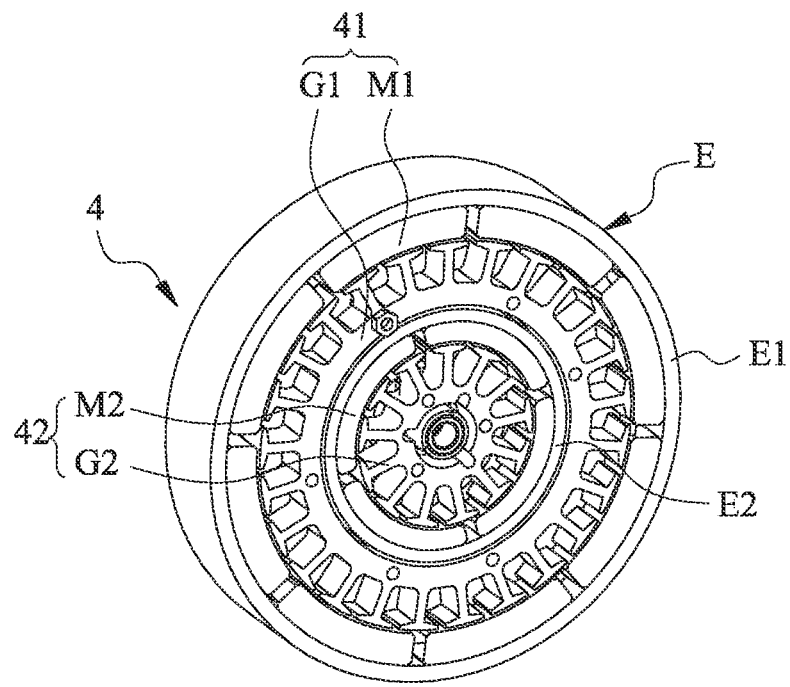
FIG. 2 is a perspective view showing a preferred example of an electricity generator according to the present invention.

Referring also to FIG. 2, a perspective view of a preferred embodiment of an electricity generator according to the present invention is shown. It is noted that although a concentric arrangement that will be described is adopted in the instant embodiment for the electricity generator, the present invention is not limited thereto and a non-concentric arrangement or other arrangements that are fit to disposition in an interior of the rotating object E can be used for the electricity generator of the present invention.

As shown in FIG. 2, the electricity generator 4 of the instant embodiment mainly comprises a rotating object E, a first electricity generation unit 41, and a second electricity generation unit 42. In the instant embodiment, the rotating object E is a flywheel, which comprises an outer annular frame E1 and an inner annular frame E2. The inner annular frame E2 is disposed in an interior of the outer annular frame E1 and is arranged in a concentric arrangement. The first electricity generation unit 41 is disposed between the outer annular frame E1 and the inner annular frame E2, and the second electricity generation unit 42 is disposed in an interior of the inner annular frame E2 of the rotating object E.

The first electricity generation unit 41 comprises a plurality of first magnetic elements M1 and a first electricity-generating coil G1. The second electricity generation unit 42 comprises a plurality of second magnetic elements M2 and a second electricity-generating coil G2. In the unit, the plurality of first magnetic elements M1 are mounted, in an equally-spaced manner, on the outer annular frame E1, and plurality of second magnetic elements M2 are mounted, in an equally-spaced manner, on the inner annular frame E2. The first electricity-generating coil G1 is arranged between the outer annular frame E1 and the inner annular frame E2, and is spaced from the plurality of first magnetic elements M1 by a gap. The second electricity-generating coil G2 is arranged in the interior of the inner annular frame E2, and is spaced from the plurality of second magnetic elements M2 by a gap.

As such, when the rotating object E is driven to rotate and thus drives the plurality of first magnetic elements M1 and the plurality of second magnetic elements M2 to rotate, the first electricity generation unit 41 and the second electricity generation unit 42 may generate electricity by means of electromagnetic induction. However, although the instant embodiment is structured to include two electricity generation units that are arranged concentrically in the interior of the rotating object E, the present invention is not limited thereto, and in other embodiments, three or more than three electricity generation units can be involved. Further, each of the electricity generation units may generate electricity independently and this significantly increases the amount of electricity generated and the concentric arrangement make the size very compact so that an increased amount of electrical power can be generated without expansion of the size of the flywheel.

Further, as shown in FIG. 1, the control unit 5 at least comprises an analog-to-digital converter (ADC), an arithmetic logic unit (ALU), and an input/output (I/O) port. Further, a cycling computer or an electronic dashboard C allows a user to make settings of the resistance or other exercise parameters to the control unit 5, and may be used, on the other hand, to display the exercise parameters or physiological data of the user, such as heartbeat, consumption of calorie, riding mileage, and so on.

The transmission system 7 of the instant embodiment is a wireless communication system, such as Bluetooth, ANT+, and FE-C protocol communication system, but the present invention is not limited thereto and can be a wired transmission system. In the instant embodiment, the transmission system 7 is electrically connected to the control unit 5 and is in communication connection with an external electronic device OD, so as to enable interaction between the control unit 5 and the external electronic device OD. An example of the external electronic device OD is a smart phone.

The operation of the instant embodiment will be described below. Firstly, a user makes setting of a resistance level by means of the electronic dashboard C to serve as a resistance control parameter. It is appreciated that there are other ways, as may be embodied differently, may be adopted to make the setting, such as a rotary knob, a push button, or direct input or loading a program or application or a file that includes a preset training program. Further, the user may alternatively uses an external electronic device OD (such as a mobile phone, a tablet computer, a notebook computer, or other electronic devices having such an effect) to transmit or input, by means of the transmission system 7, various riding training or online competition game programs, to the control unit 5 of the resistance feedback system 1. Taking a specific route of riding training application as an example for illustration, the riding training program may set a slope of a path of the route as the resistance control parameter, or may alternatively use a riding speed and a corresponding wind resistance as resistance control parameters, and may additionally take a road condition or weather factor as the resistance control parameter. Based on the above resistance control parameters, the control unit 5 may control the electromagnetic resistance generation unit 2 to generate and apply an electromagnetic resistance force to the rotating object E.

Further, the control unit 5 controls the electromagnetic resistance generation unit 2 to generate the electromagnetic field with a preset strength, and at the same time, the electromagnetic detection element 31 of the feedback circuit 3 detects, instantaneously, and transmits the strength of the electromagnetic field actually generated by the electromagnetic resistance generation unit 2 (which will be referred to as "actual electromagnetic field strength" herein) back to the control unit 5. Further, the control unit 5 compares the actual electromagnetic field strength so detected with a predetermined electromagnetic field strength level, such that when the two do not match, the control unit 5 controls the electromagnetic resistance generation unit 2 to carry out adjustment of the strength of the electromagnetic field actually generated thereby to correspond to the predetermined electromagnetic field strength.

Figure 3:
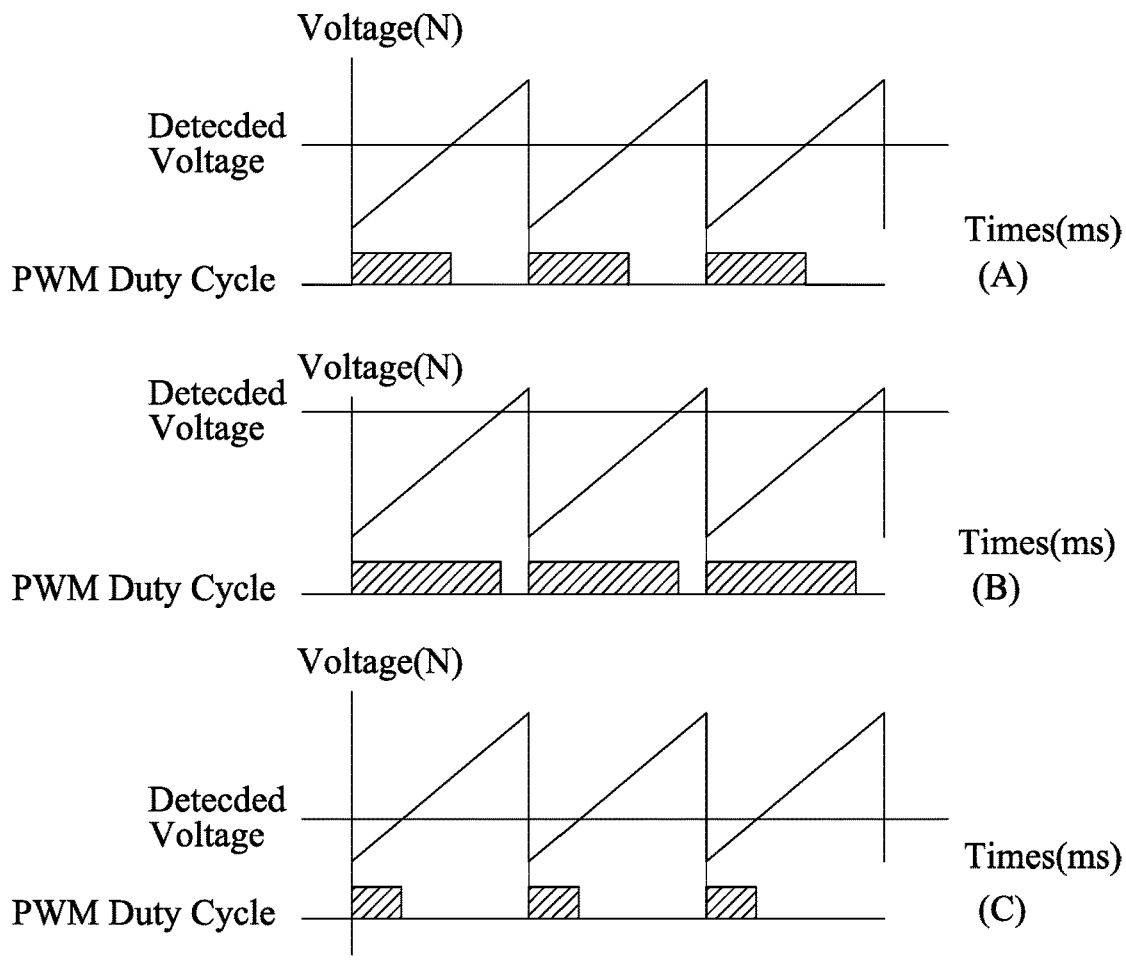
FIG. 3 shows waveforms illustrating relationships between detected voltages of electromagnetic detection element and corresponding duty cycles of control signals at different temperatures.

FIG. 3 shows waveforms illustrating relationships between detected voltages of the electromagnetic detection element and corresponding duty cycles of a control signal at different temperatures. In the instant embodiment, the control unit 5 uses a pulse width modulation (PWM) to control the drive circuit 21. As shown in waveform A of FIG. 3, at a present normal temperature, the actual electromagnetic field strength detected by the electromagnetic detection element 31 matches with the predetermined electromagnetic field strength level, and the electromagnetic detection element 31 outputs a detected voltage of 1.5V, and the control unit 5 correspondingly outputs a PWM signal of which the duty cycle maintains constant.

In a condition of temperature rising, reference being now made to waveform B of FIG. 3, in which the actual electromagnetic field strength drops, and the detection voltage output from the electromagnetic detection element 31 is raised to, for example 2.5V. Under this condition, the control unit 5 increases the duty cycle of the PWM signal to for example 1.75 times of the initial value in order to increase the actual electromagnetic field strength to match with the predetermined electromagnetic field strength level. Oppositely, in a condition of temperature lowering, reference being to waveform C of FIG. 3, in which the actual electromagnetic field strength rises, and the detection voltage output from the electromagnetic detection element 31 is lowered to for example 0.5V. Under this condition, the control unit 5 decreases the duty cycle of the PWM signal to for example 0.5 of the initial value in order to decrease the actual electromagnetic field strength to match with the predetermined electromagnetic field strength level.

Figure 4:
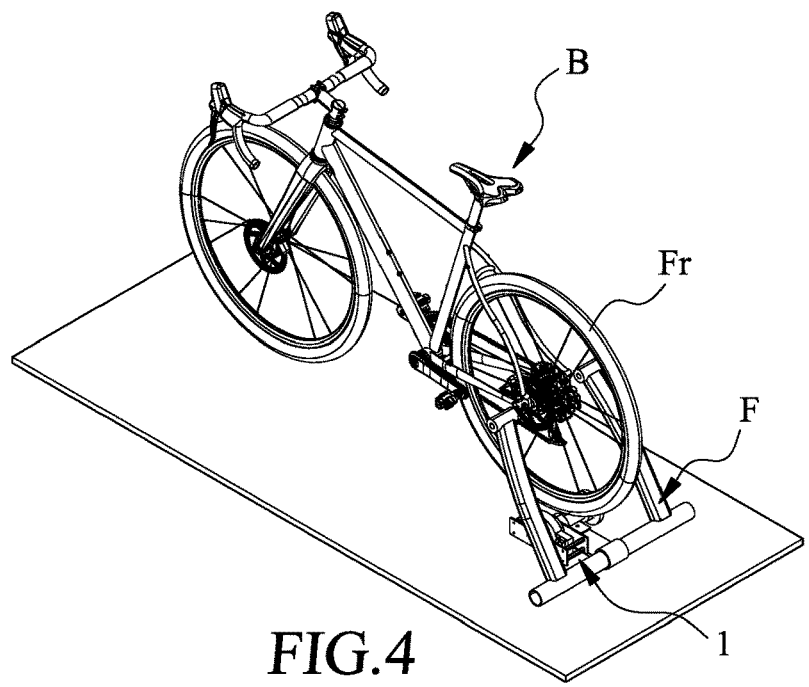
FIG. 4 is a perspective view showing a first embodiment of a pedaling training device according to the present invention.
Figure 5A:
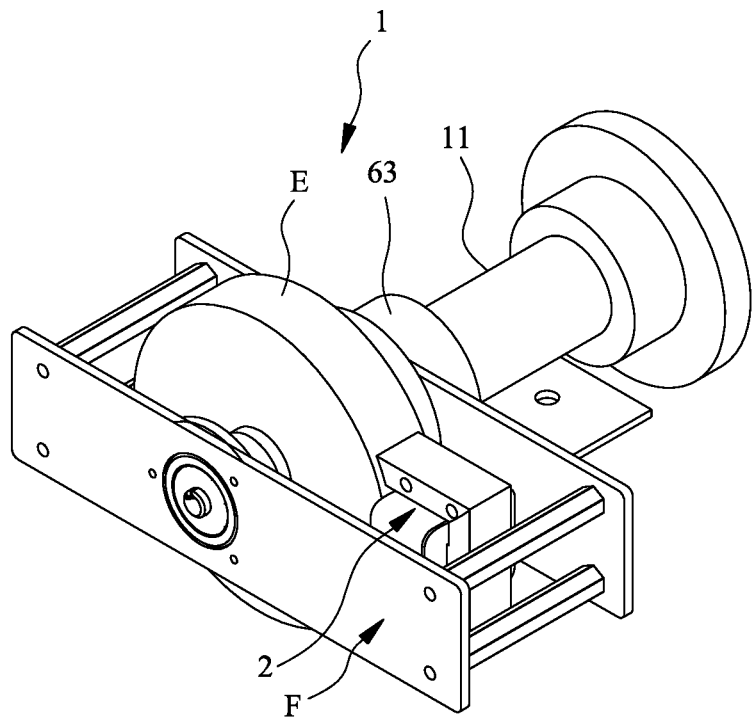
FIG. 5A is a perspective view illustrating the pedaling training device of the first embodiment of the present invention shown in FIG. 4, with a bicycle trainer frame removed.
Figure 5B:
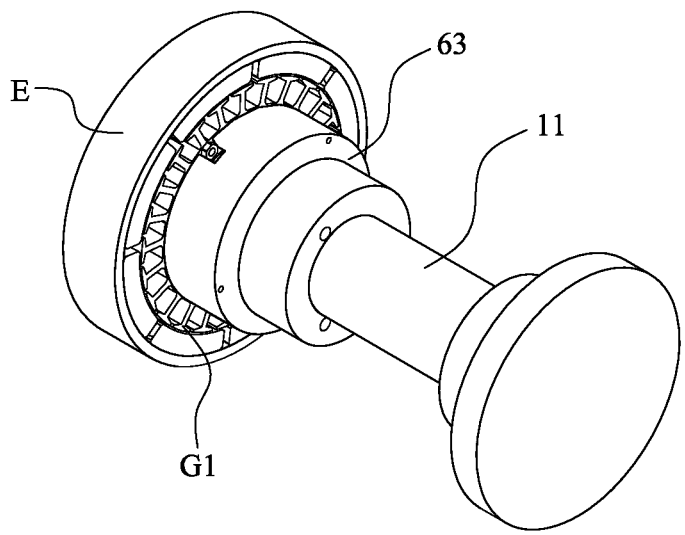
FIG. 5B is a perspective view illustrating an electricity generator and a roller of the first embodiment of the pedaling training device shown in FIG. 4.

Referring collectively to FIGS. 4, 5A, and 5B, FIG. 4 is a perspective view showing a first embodiment of a pedaling training device according to the present invention; FIG. 5A is a perspective view showing the first embodiment of the pedaling training device according to the present invention, with a bicycle trainer frame removed; and FIG. 5B is a perspective view showing an electricity generator and a roller of the first embodiment of the pedaling training device according to the present invention. As shown in the drawings, the pedaling training device of the instant embodiment is structured such that a rear wheel Fr of a bicycle B is arranged to directly drive the resistance feedback system 1 according to the present invention.

Specifically, the pedaling training device of the instant embodiment comprises a bicycle trainer frame F and the resistance feedback system 1 described above, wherein the resistance feedback system 1 is mounted to the bicycle trainer frame F. In the instant embodiment, the resistance feedback system 1 comprises a roller 11, which is connected by a mounting frame 63 to the rotating object E. The first electricity-generating coil G1 and the second electricity-generating coil G2 are mounted to the mounting frame 63 to form a stator of the electricity generator. Further, the bicycle B has a rear fork to which a wheel axle of the rear wheel is mounted to be supported on the bicycle trainer frame F, so that when a user treads down pedals of the bicycle B, the rear wheel Fr rotates and thus drives the roller 11 to drive the rotating object E to rotate.

Figure 6A:
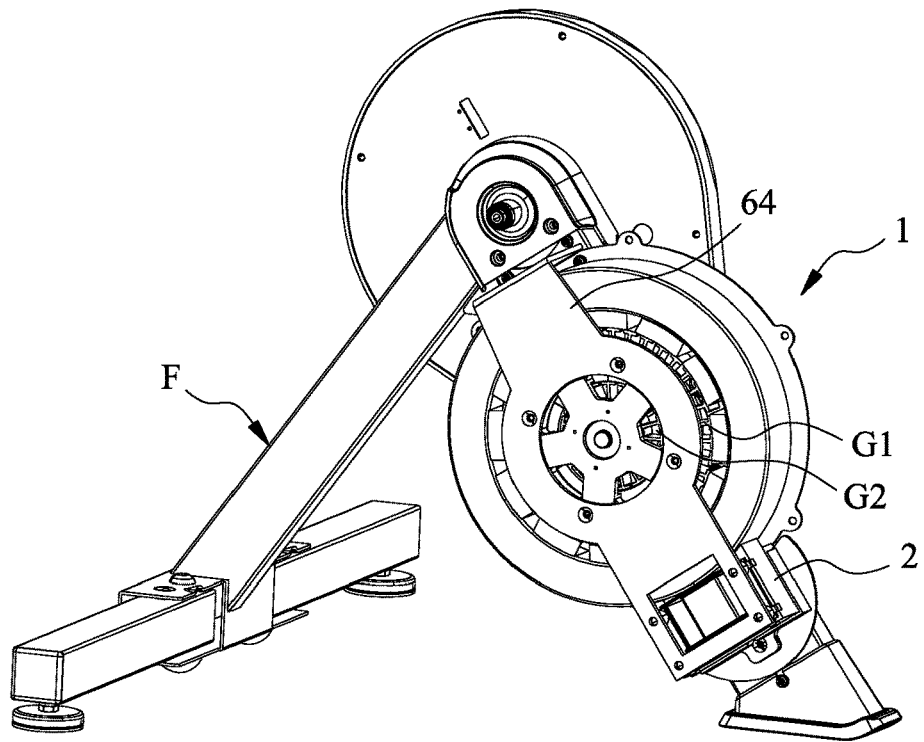
FIG. 6A is a perspective view showing a second embodiment of the pedaling training device according to the present invention.
Figure 6B:
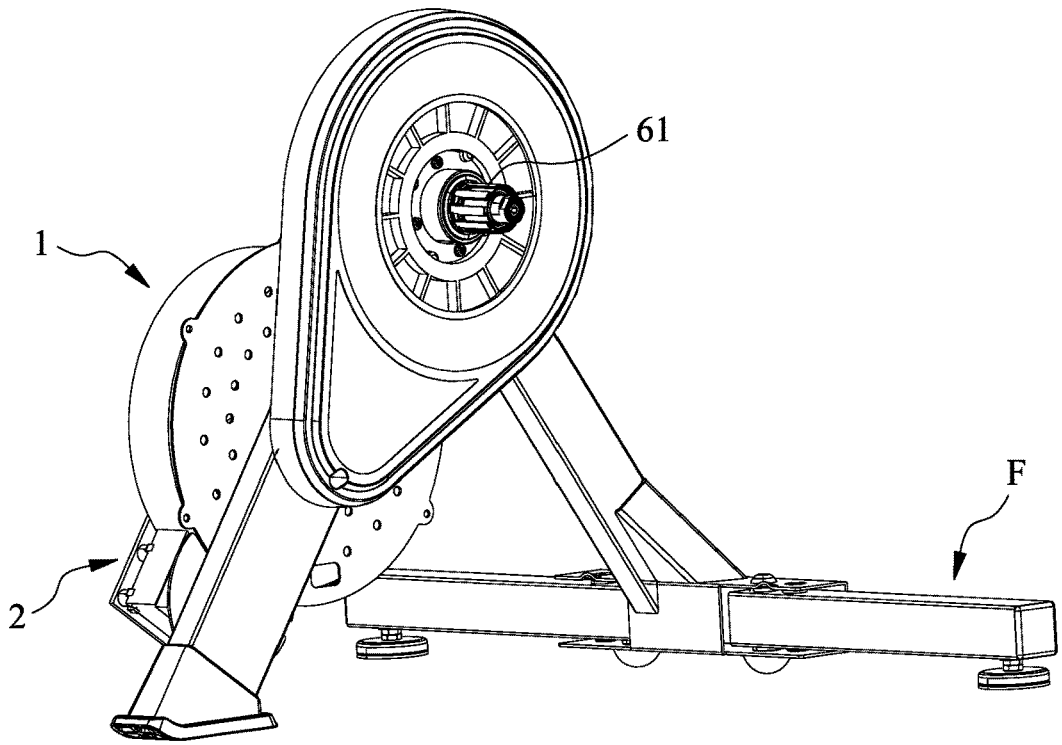
FIG. 6B is another perspective view showing the second embodiment of the pedaling training device according to the present invention.
Figure 7:
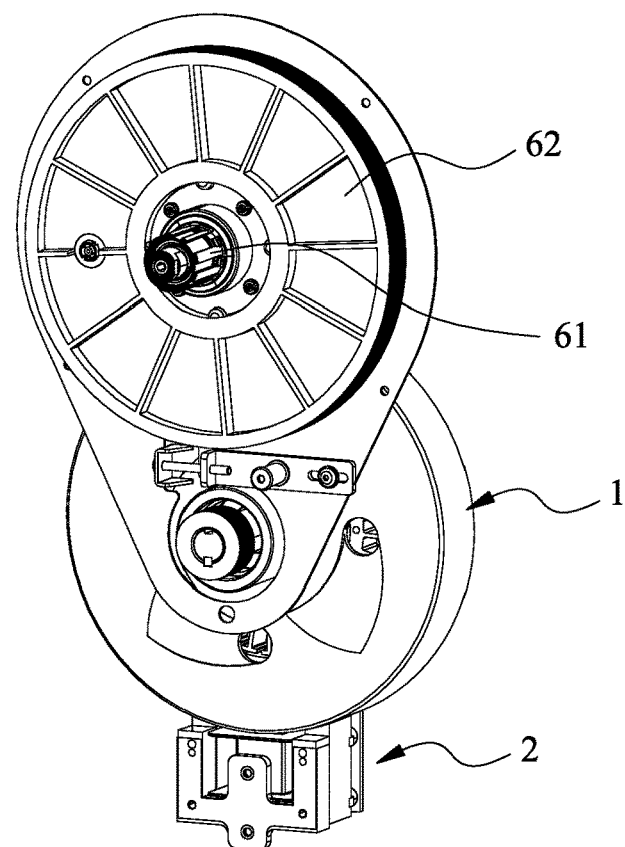
FIG. 7 is a perspective view showing the second embodiment of the pedaling training device according to the present invention, with a bicycle trainer frame and a part of an outer cover removed.

Referring collectively to FIGS. 6A, 6B, and 7, FIG. 6A is a perspective view showing a second embodiment of the pedaling training device according to the present invention; FIG. 6B is another perspective view showing the second embodiment of the pedaling training device according to the present invention; and FIG. 7 is a perspective view showing the second embodiment of the pedaling training device according to the present invention, with a bicycle trainer frame and a part of an outer cover removed. The second embodiment of the pedaling training device according to the present invention is different from the first embodiment mainly in that the instant embodiment does not achieve driving by means of the rear wheel of the bicycle and instead, a driving wheel 62 is provided to take the place of a wheel axle of the rear wheel of the bicycle.

Specifically, in addition to the bicycle trainer frame F and the resistance feedback system 1, the pedaling training device of the instant embodiment further comprises a mounting axle 61, the driving wheel 62, and a mounting frame 64. The first electricity-generating coil G1, the second electricity-generating coil G2, and the electromagnetic resistance generation unit 2 of the resistance feedback system 1 are all mounted to the mounting frame 64, and the mounting frame 64 is connected to the bicycle trainer frame F, so that the first electricity-generating coil G1 and the second electricity-generating coil G2 constitute the stator of the electricity generator.

Further, the mounting axle 61 is arranged to extend from a center of the driving wheel 62 and is connected to a bicycle. For example, the mounting axle 61 comprises a toothed disk mounted thereto and a bicycle of which a rear wheel is removed is mounted to the mounting axle 61, and a chain is connected between the toothed disk of the mounting axle 61 and a central transmission axle of the rotating object E. As such, when a pedaling mechanism of the bicycle B is treaded to cause the mounting axle 61 to rotate, the driving wheel 62 is caused to drive the rotating object E to rotate.

Figure 8:
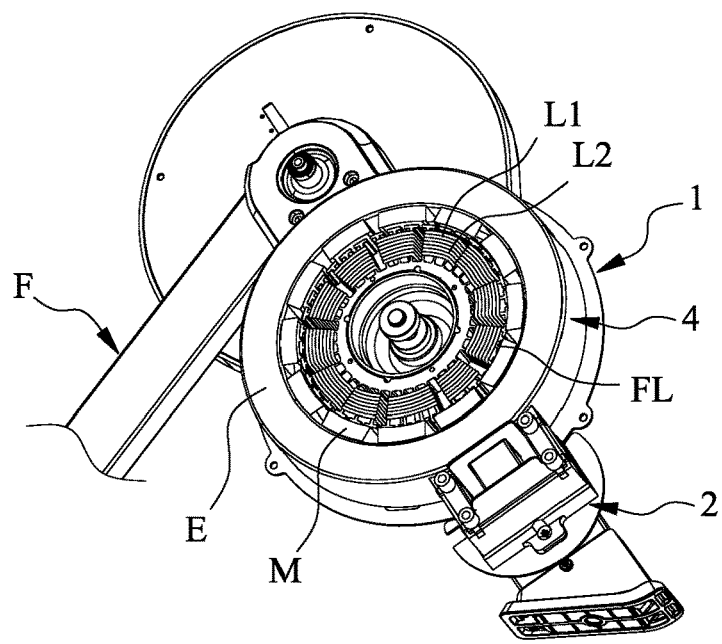
FIG. 8 is a perspective view showing an electricity generator of the second embodiment of the pedaling training device according to the present invention.

Referring further to FIG. 8, FIG. 8 is a perspective view showing the electricity generator of the second embodiment of the pedaling training device according to the present invention. As shown in the drawing, the electricity generator 4 of the instant embodiment is different from the previous embodiments in that in the instant embodiment, the electricity generator 4 does not adopt a concentric arrangement and is still constructed to includes two sets of electricity-generating coils, including a first electricity-generating coil L1 and a second electricity-generating coil L2, and the first electricity-generating coil L1 and the second electricity-generating coil L2 are arranged on the coil frame FL in a manner of being alternate with each other. In other words, when the rotating object E rotates to cause the permanent magnets M to pass each of the coils, the first electricity-generating coil L1 and the second electricity-generating coil L2 both generate electricity and output electrical power. It is noted here that both the concentric arrangement of multiple coils provided in the first embodiment and the polarity alternating arrangement of multiple coils provided in the second embodiment, achieve the same main purpose of increasing the amount of electrical power generated thereby for supplying to the system of the present invention to fulfill the purposes of autonomous electricity generation and self-supply.

Figure 9A:
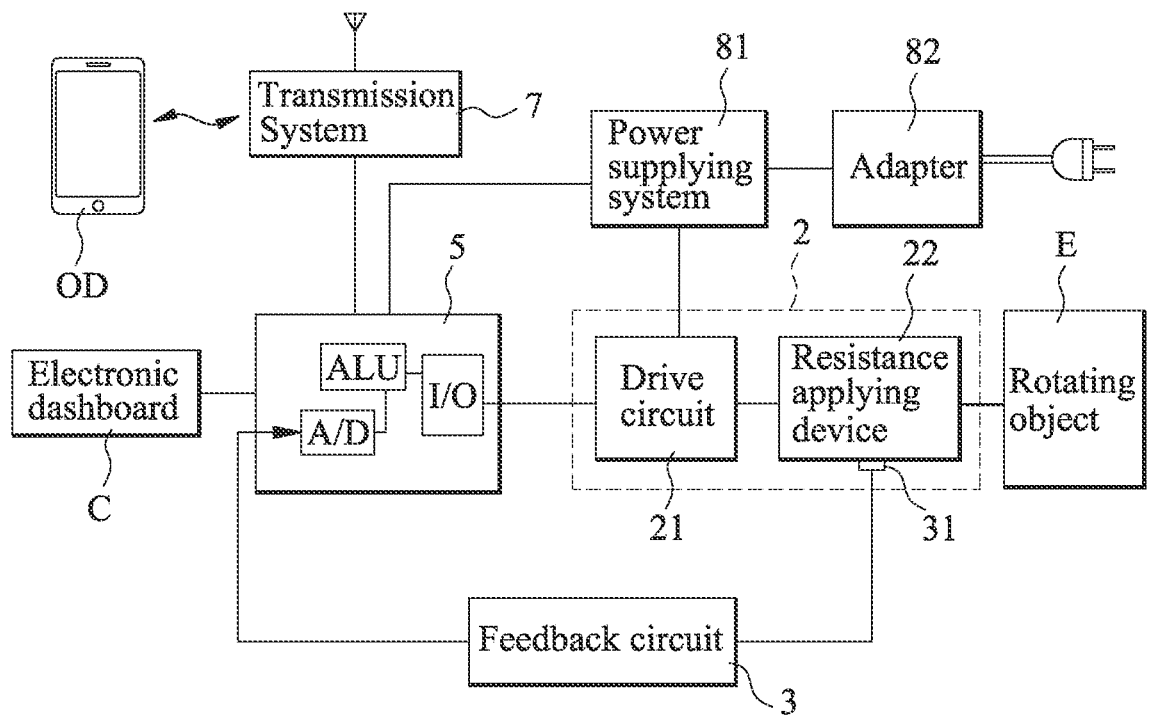
FIG. 9A shows a system block diagram according to another preferred embodiment of the present invention.
Figure 9B:
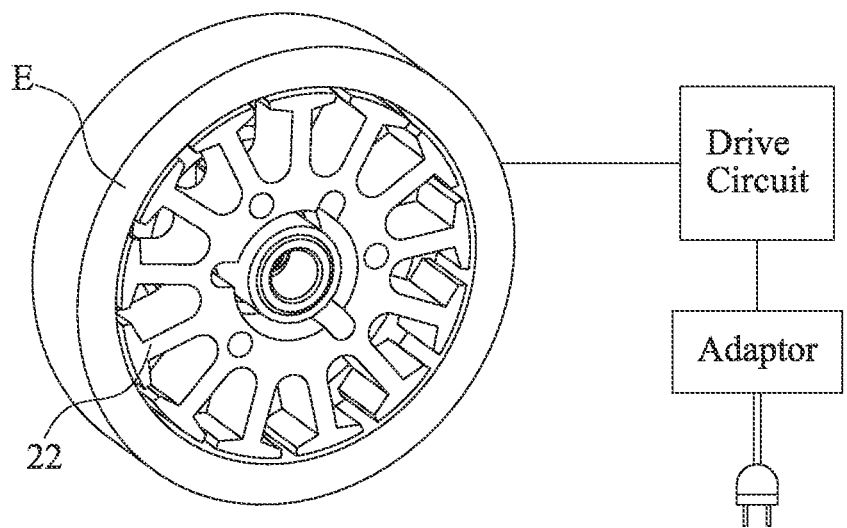
FIG. 9B is a schematic view showing a resistance applying device according to said another preferred embodiment of the present invention.

Referring further to FIGS. 9A and 9B, FIG. 9A shows a system architecture according to another preferred embodiment of the present invention and FIG. 9B is a schematic view showing a resistance applying device according to said another preferred embodiment of the present invention. As shown in the drawings, the instant embodiment is generally different from the previous embodiments in that electrical power that the instant embodiment consumes is supplied from an external, commercial power source and is not the self-supply electricity generator described above. In other words, in the instant embodiment, a power supplying system 81 is electrically connected, via an adaptor 82, to the external power source to receive electrical power from the external power source. Further, the resistance applying device 22 shown in FIG. 9B is operable as being driven by the drive circuit 21 with a PWM waveform, a coil (not shown) of the resistance applying device 22 is excited to attract the rotating object E, so as to induce an electromagnetic resistance force against the rotation of the rotating object E. As such, in addition to the purpose of self-supply of electricity by means of the electricity generator 4, the present invention is also applicable to different embodiment in which direct connection is made to an external power source to receive electrical power from the external power source.

Figure 10A:
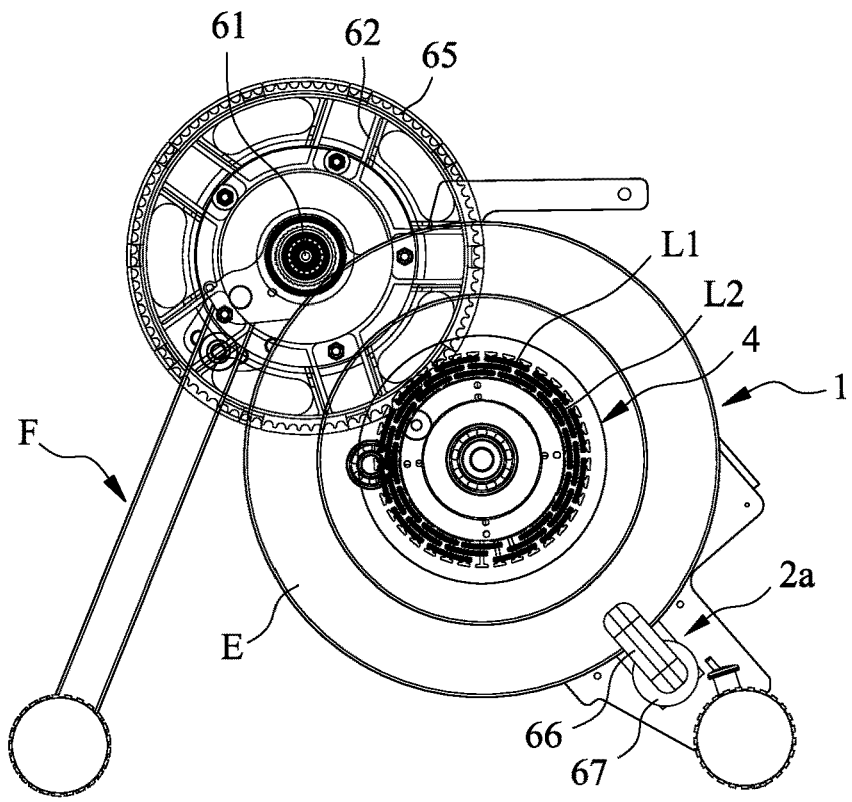
FIG. 10A is a side elevational view showing a third embodiment of the pedaling training device according to the present invention.
Figure 10B:
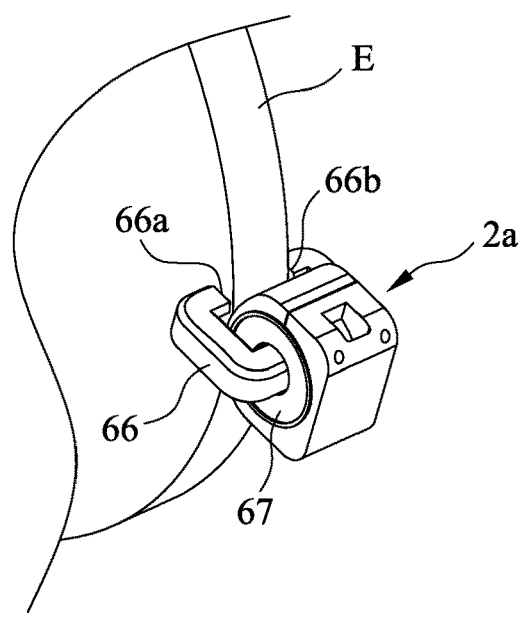
FIG. 10B is a perspective view of an electromagnetic resistance generation unit shown in FIG. 10A.

Referring to FIGS. 10A and 10B, FIG. 10A is a side elevational view showing a third embodiment of the pedaling training device according to the present invention, and FIG. 10B is a perspective view of an electromagnetic resistance generation unit shown in FIG. 10A. Similar to the embodiments shown in FIGS. 6A, 6B, 7, and 8, the instant embodiment provides a driving wheel 62 having an outer annular rim that is formed with a toothed disk 65, and a chain (not shown) is connected between the toothed disk 65 and a central transmission axle of the rotating object E. As such, when the mounting axle 61 rotates and drives the driving wheel 62 to rotate, the rotating object E is driven by means of the chain to rotate, so that the first electricity-generating coil L1 and the second electricity-generating coil L2 are caused to generate electricity and output electrical power.

However, the instant embodiment adopts a different arrangement of electromagnetic resistance generation unit 2a, which comprises a C-shaped silicon lamination 66 and a winding 67 wound around the C-shaped silicon lamination 66. The C-shaped silicon lamination 66 is formed with a pair of opposite open ends 66a, 66b arranged to adjacently face toward two opposite surfaces of the rotating object E, as shown in FIG. 10B. When the winding 67 is excited by an electrical current, an electromagnetic field is generated thereby between the opposite open ends 66a, 66b to induce an electromagnetic resistance force to the rotating object E.

Figure 11:
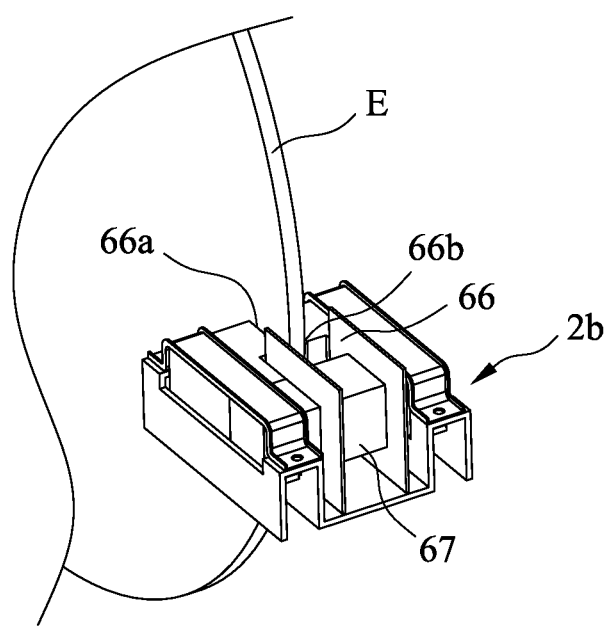
FIG. 11 is a perspective view showing an electromagnetic resistance generation unit according to a fourth embodiment of the present invention.

FIG. 11 is a perspective view showing an electromagnetic resistance generation unit according to a fourth embodiment of the present invention. Similar to the embodiments shown in FIG. 10B, the instant embodiment provides an E-typed electromagnetic resistance generation unit 2b, which comprises an E-shaped silicon lamination 66 and a winding 67 wound around the E-shaped silicon lamination 66. The E-shaped silicon lamination 66 is formed with a pair of opposite open ends 66a, 66b arranged to adjacently face toward two opposite surfaces of the rotating object E. When the winding 67 is excited by an electrical current, an electromagnetic field is generated thereby between the opposite open ends 66a, 66b to induce an electromagnetic resistance force to the rotating object E.

The embodiments described above are provided as examples for illustration, and the scope of the protection that the present invention pursues is determined only according to the appended claims, and is not limited to the embodiments described above.

What is claimed is:

1. An electrical resistance feedback system for a bicycle training device, comprising:
   a bicycle trainer frame arranged for connection with a bicycle;
   an electricity generator including a rotating object, mounted to the bicycle trainer frame; and
   a resistance feedback system mounted to the bicycle trainer frame, wherein the resistance feedback system comprises:
      a transmission system configured to interact with an external electronic device;
      an electromagnetic resistance generation unit, separate from the electricity generator, excitable by an electrical current to generate an electromagnetic field to induce an electromagnetic resistance force to the rotating object, wherein the electromagnetic resistance generation unit includes a drive circuit and a resistance applying device having at least one winding;
      a feedback circuit having an electromagnetic detection element mounted to the resistance applying device of the electromagnetic resistance generation unit, wherein the electromagnetic detection element is a Hall sensor and is configured to detect strength of the electromagnetic field generated by the resistance applying device; and
      a control unit electrically connected to the transmission system, the electromagnetic resistance generation unit, the feedback circuit, and the electricity generator;
   wherein the drive circuit is electrically connected to the electricity generator, the control unit and the resistance applying device, and is controlled, by the control unit, to adjust the strength of the electromagnetic field generated by the resistance applying device;
   wherein the control unit is configured to receive, from the electromagnetic detection element, the strength of the electromagnetic field generated by the resistance applying device and in response thereto, adjust a level of the electromagnetic resistance force generated by the electromagnetic resistance generation unit;
   wherein the control unit is further configured to control the electromagnetic resistance generation unit to generate a predetermined level of electromagnetic resistance force, the predetermined level of electromagnetic resistance force corresponding to a predetermined electromagnetic field strength;
   wherein when the electromagnetic detection element detects the strength of the electromagnetic field generated by the resistance applying device being different from the predetermined electromagnetic field strength, the control unit controls the drive circuit to adjust the strength of the electromagnetic field generated by the resistance applying device such that the strength of the electromagnetic field generated by resistance applying device matches with the predetermined electromagnetic field strength; and
   wherein the control unit controls the drive circuit to adjust the strength of the electromagnetic field generated by the resistance applying device, by applying a pulse width modulation signal to the drive circuit and controlling a duty cycle of the pulse width modulation signal.

2. The electrical resistance feedback system according to claim 1, wherein the electricity generator further comprises:
an outer annular frame and an inner annular frame formed on the rotating object, wherein the inner annular frame is disposed in an interior of the outer annular frame to form a concentric arrangement;
a first electricity generation unit disposed between the outer annular frame and the inner annular frame of the rotating object; and
a second electricity generation unit disposed in an interior of the inner annular frame of the rotating object; wherein when the rotating object is driven to rotate, at least one of the first electricity generation unit and the second electricity generation unit is caused to generate electricity.

3. The electrical resistance feedback system according to claim 2, wherein the first electricity generation unit comprises a plurality of first magnetic elements and a first electricity-generating coil, and the second electricity generation unit comprises a plurality of second magnetic elements and a second electricity-generating coil; the plurality of first magnetic elements are arranged on the outer annular frame in an equally-spaced manner and the plurality of second magnetic elements are arranged on the inner annular frame in an equally-spaced manner; the first electricity-generating coil is arranged between the outer annular frame and the inner annular frame and is spaced from the plurality of first magnetic elements by a gap, and the second electricity-generating coil is arranged in the interior of the inner annular frame and is spaced from the plurality of second magnetic elements by a gap.

4. The electrical resistance feedback system according to claim 3, further comprising a mounting frame mounted to the bicycle trainer frame, and the first electricity-generating coil and the second electricity-generating coil are mounted on the mounting frame.

5. The electrical resistance feedback system according to claim 1, wherein the transmission system receives a resistance control parameter from the external electronic device, and the control unit adjusts the level of the electromagnetic resistance force generated by the electromagnetic resistance generation unit according to the resistance control parameter, wherein the resistance control parameter comprises at least one of speed, slope, and wind resistance.

6. The electrical resistance feedback system according to claim 1, wherein the control unit applies the pulse width modulation signal to control the drive circuit, such that when the strength of the electromagnetic field generated by the resistance applying device is less than the predetermined electromagnetic field strength, the control unit increases the duty cycle of the pulse width modulation signal applied; and when the strength of the electromagnetic field generated by the resistance applying device is greater than the predetermined electromagnetic field strength, the control unit decreases the duty cycle of the pulse width modulation signal applied.

7. The electrical resistance feedback system according to claim 1, further comprises a roller coupled to the rotating object; a wheel axle of a rear wheel of the bicycle being mounted to the bicycle trainer frame, and the rear wheel of the bicycle being in contact with the roller.

8. The electrical resistance feedback system according to claim 1, further comprising a mounting axle and a driving wheel, the mounting axle being extended from a center of the driving wheel, the driving wheel being operatively coupled to the rotating object, wherein when a pedaling mechanism of the bicycle acts on the mounting axle, the driving wheel drives the rotating object to rotate.

9. The electrical resistance feedback system according to claim 1, wherein the resistance applying device further comprises a C-shaped silicon lamination and the at least one winding wound around the C-shaped silicon lamination, the C-shaped silicon lamination having a pair of opposite open ends being arranged to adjacently face two opposite surfaces of the rotating object respectively.

10. The electrical resistance feedback system according to claim 1, wherein the resistance applying device further comprises an E-shaped silicon lamination and the at least one winding wound around the E-shaped silicon lamination, the E-shaped silicon lamination having a pair of opposite open ends being arranged to adjacently face two opposite surfaces of the rotating object respectively.

* * * * *